United States Patent
Li et al.

(10) Patent No.: US 7,710,522 B1
(45) Date of Patent: May 4, 2010

(54) LIQUID CRYSTAL DEVICE HAVING VARIABLE REFLECTED WAVELENGTH

(75) Inventors: Zili Li, Barrington, IL (US); Jon Schindler, Chicago, IL (US); Robert Akins, Palatine, IL (US); George Valliath, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 2708 days.

(21) Appl. No.: 09/667,641

(22) Filed: Sep. 23, 2000

(51) Int. Cl.
*G02F 1/1335* (2006.01)
(52) U.S. Cl. ...................................... 349/115
(58) Field of Classification Search ................. 349/115, 349/75, 97, 98, 176, 141
See application file for complete search history.

(56) References Cited

U.S. PATENT DOCUMENTS

| | | | | |
|---|---|---|---|---|
| 4,726,663 | A * | 2/1988 | Buzak | 349/80 |
| 5,576,867 | A | 11/1996 | Baur et al. | 359/87 |
| 5,598,285 | A * | 1/1997 | Kondo et al. | 349/39 |
| 5,600,464 | A | 2/1997 | Ohe et al. | 349/123 |
| 5,737,051 | A | 4/1998 | Kondo et al. | 349/141 |
| 5,760,856 | A | 6/1998 | Yanagawa et al. | 349/42 |
| 5,786,876 | A | 7/1998 | Ota et al. | 349/42 |
| 5,822,029 | A * | 10/1998 | Davis et al. | 349/115 |
| 5,942,154 | A | 8/1999 | Kim et al. | |
| 6,025,899 | A * | 2/2000 | Fukunaga et al. | 349/115 |
| 6,278,505 | B1 | 8/2001 | Okada et al. | |
| 6,693,689 | B1 * | 2/2004 | Kim et al. | 349/113 |

OTHER PUBLICATIONS

Meyer, Robert B. "Distortion of a Cholesteric Structure by a Magnetic Field." *Applied Physics Letters* 14 (1969): 208-209.
Kahn, Frederic J. "Electric-Field-Induced Color Changes and Pitch Dilation in Cholesteric Liquid Crystals." *Physical Review Letters* 24 (1970): 209-212.
Soref, R.A. "Field Effects in Nematc Liquid Crystals Obtained With Interdigital Electrodes." *Journal of Applied Physics* 45 (1974): 5466-5468.
Ohta, M., M. Oh-e, K. Kondo. "Development of Super-TFT-LCDs With In-Plane Switching Display Mode." *Asia Display Proceedings* S30-2, Oct. 10-18, 1995.

* cited by examiner

*Primary Examiner*—James A Dudek
(74) *Attorney, Agent, or Firm*—Gary J. Cunningham

(57) ABSTRACT

A liquid crystal device comprises a cholesteric liquid crystal material interposed between a transparent front plate and a back plate. The cholesteric liquid crystal material is switchable between a transparent state and a reflective state in response to an electric field applied in a first direction. In the reflective state the material reflects light characterized by a first wavelength when no electric field is applied. Electrodes are provided for applying an electric field lied to the cholesteric liquid crystal material in the reflective state in a second direction distinct from the first direction. In this manner the cholesteric liquid crystal material is altered to cause the material to reflect light characterized by a second wavelength different from the first wavelength. A display device may thus be produced having pixels capable of a wide range of colors, thereby achieving a multicolored image for the display.

3 Claims, 2 Drawing Sheets

LIQUID CRYSTAL DEVICE HAVING VARIABLE REFLECTED WAVELENGTH

This invention relates to cholesteric liquid crystal devices. More particularly, the invention relates to such device comprising a cholesteric liquid crystal material having a reflective state, in which the wavelength of the reflected light is altered by an applied electric field, and to the method of operating the device to alter the wavelength of the reflected light.

BACKGROUND OF THE INVENTION

A typical cholesteric liquid crystal display device comprises a layer of cholesteric liquid crystal material disposed between a front transparent plate and a back plate. Electrodes formed of a transparent, conductive film an applied to the inner surfaces of the plates. In response to an electric field applied between the electrodes perpendicular to the front plate, $V_\perp$, the cholesteric liquid crystal material switches between a transparent state and a reflective state. In the reflective state, the cholesteric material intercepts light through the front plate and reflects the light back through the front plate. A typical display comprises a plurality of pixels, each corresponding to a distinct region of cholesteric liquid crystal layer having electrodes that switch the region' independent of other regions. In the reflective state, the region forms a bright pixel that cooperates with light from surrounding pixels to create an image for the display.

A preferred type of cholesteric liquid crystal material is composed of chiral dopants and a nematic host. The nematic molecules are elongated along a longitudinal molecular axis. In the presence of the chiral dopant, the molecules form a helical arrangement in the reflective state, with the molecular axes perpendicular to the helical axis and the helical axis perpendicular to the front plate. The helical arrangement is characterized by a pitch which is directly related to the wavelength, $\lambda$, of the reflected light. In contrast, when the molecules are not aligned, referred to as a scattered state, the material becomes transparent. Application of an electric field along the helical axis is effective to switch the cholesteric liquid crystals between the transparent state and the reflective state by scattering the molecules or causing them to align. Once switched, the cholesteric material remains in the state even after the electrical field is removed, until an appropriate field is applied to cause the material to switch again.

The wavelength of reflected light is determined by the pitch of the cholesteric molecules in the helical arrangement. This, in turn, is determined by the proportion of the chiral dopant to nematic molecules. Different levels of chiral dopants result in different pitch lengths. For common materials, small amounts of dopant result in reflected light having longer wavelengths, corresponding to red color, whereas higher concentrations of dopant are effective to reflect light having shorter wavelengths, shifted towards green or blue color.

Thus, one drawback of conventional cholesteric displays is that the material, once formulated, is limited to reflecting light of a predetermined wavelength, that is, a single color. In order to get a multicolored display, more that one cholesteric liquid crystal material is required. For example, layers of red, green and blue cholesteric liquid crystal materials may be stacked and then selectively switched between reflective and transparent states to form different colors. However, such stacks tend to be thick, heavy, and expensive to manufacture. They also generally require separate drivers to control the switching of each color layer.

Accordingly, there has been a long felt need for a cholesteric liquid crystal device that utilizes a single layer of liquid crystal material to form a multicolor display and that may readily manufactured as a thin, relatively inexpensive device.

DESCRIPTION OF THE INVENTION

In accordance with the present invention, a cholesteric liquid crystal device comprises a cholesteric liquid crystal material having a reflective state wherein the cholesteric material reflects light characterized by a first wavelength in the absence of an applied electric field and means for applying an electric field to cause the cholesteric liquid crystal material to reflect light characterized by a second wavelength distinct from the first wavelength. In a preferred embodiment, this invention provides a display device comprising a plurality of pixels that cooperate to create a display viewable by an observer. At each pixel, the cholesteric liquid crystal material is switchable, in response to an electric field in a first direction, between a transparent state and a reflective state. In the absence of an electric field applied in accordance with this invention, the cholesteric liquid crystal material in the reflective state reflects light characterized by a first wavelength, which corresponds to a first color for the display. In accordance with this invention, an electric field is applied to the cholesteric liquid crystal material in the reflective state in a second direction distinct from the first direction. In this manner the cholesteric liquid crystal material is altered to cause the material in the reflective state to reflect light characterized by a second wavelength different from the first wavelength, corresponding to a second color different from the first color. Thus, the color of the pixel is selected by applying an electric field nonparallel to the first direction for switching the reflectivity of the cholesteric material and preferably generally perpendicular thereto.

This invention therefore provides pixels of varying color to produce a multicolor display image. In one aspect of this invention, each pixel of the display device is formed of subpixels such that light form the subpixels combine to produce a color for the pixel. At each subpixel, the cholesteric liquid crystal material may be independently switched between the transparent and reflective states. In addition, at least one subpixel includes means for applying an electric field to alter the wavelength of reflected light. By selectively switching the cholesteric material at the subpixels and varying the color of the one subpixel, a wide range of colors may be obtained for the pixel, thereby permitting a full color display to be achieved.

Figure 1:
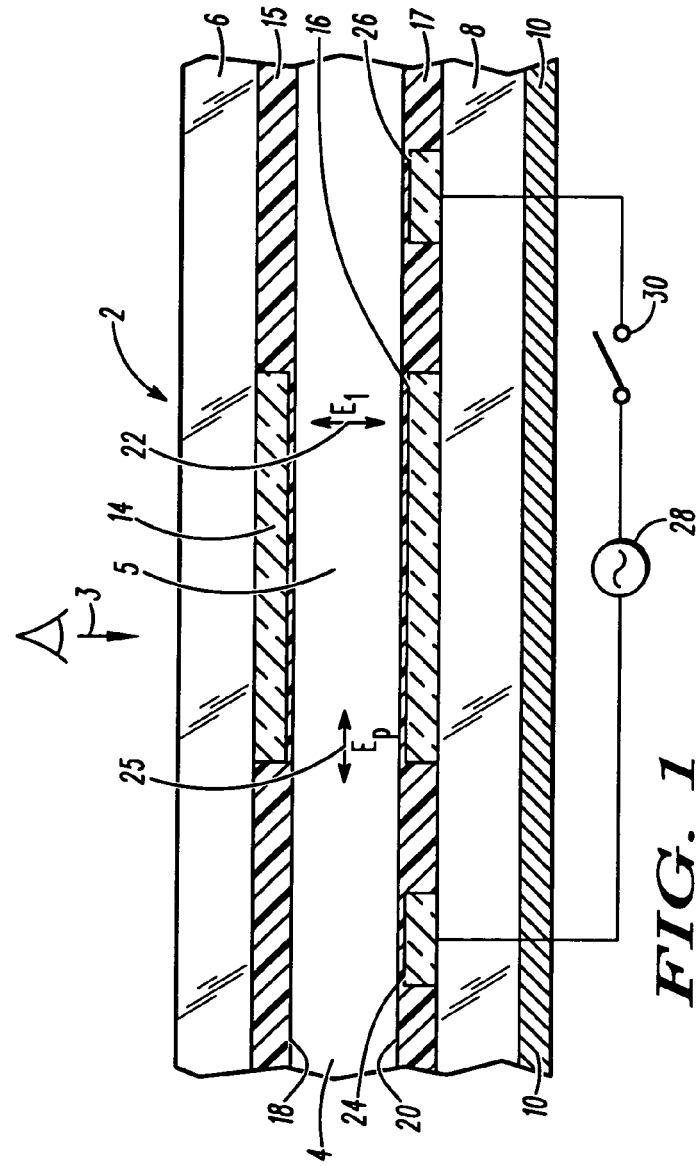
FIG. 1 is a cross-sectional view of a region of a cholesteric liquid crystal display device in accordance with the invention.

In accordance with a preferred embodiment of this invention, FIG. 1 shows an electrically tunable color cholesteric liquid crystal display device 2 for creating a display when viewed in direction 3. The display is formed of a plurality of pixels having varying reflectivity and color selected to produce a desired image. While only a portion of device 2 corresponding to a single pixel is shown in FIG. 1, device 2 may be formed of multiple pixels of similar design, each being independently switched and color adjusted to form the desired image. Device 2 comprises a single layer 4 of a cholesteric liquid crystal material. The reflectivity and color of the pixel is determined by the properties of the cholesteric material at a region 5. In accordance with this invention, the cholesteric material at region 5 may not only be switched between transparent and reflective states to create a dark or bright pixel, but also is adapted to allow the wavelength of reflected light to be altered in response to an applied electric field to thereby obtain a desired color. Also significantly, the reflectivity and color of the material at region 5 may be altered independently from the surrounding material, thereby permitting the light from each pixel to be selected as needed for the desired display image.

Display device 2 comprises a front transparent plate 6 and a back plate 8 about layer 4. Plate 6 is suitably formed of transparent material, such as glass or transparent polymeric material, for admitting light to the device, which light is reflected or absorbed to create the desired condition of the pixel. Back plate 8 is typically similar to front plate 6, but may be suitably formed of any material to provide, in combination with the front plate, desired strength and rigidity for the device. In this embodiment, back layer 8 is transparent and has an outer, opaque layer 10, which absorbs light transmitted through device 2. In this manner, when the cholesteric liquid crystal material is in the transparent state, light entering the device through front plate 6 is transmitted through region 5 and absorbed by coating to create a dark or black pixel for the display. Layer 10 is preferably applied on outer surface 12 of back layer 8 as a coating or an adhesively bonded film. Alternatively, back plate 8 could itself be opaque to absorb light transmitted through device 2 without need for additional layer 10.

The cholesteric liquid crystal material is switchable between a transparent state and a reflective state in response to an electric field $E_t$ applied in first direction 22 generally perpendicular to the front plate and parallel to the viewing direction 3. For this purpose, device 2 comprises a pair of first electrodes 14 and 16 disposed on interior surfaces 18 and 20 of front plate 6 and back plate 8, respectively. Electrodes 14 and 16 are preferably formed of films of an electrically conductive, transparent material such as indium tin oxide, antimony tin oxide, or other such material which is applied at a thickness sufficient to promote conduction while thin enough to maintain transparency. The film is coated onto the surface and patterned to define the desired electrodes. Thereafter, transparent polymeric coatings 15 and 17 are applied over electrodes 14 and 16 and have rubbed inner surfaces 16 and 18 for orienting the cholesteric liquid crystal molecules in the reflective state in a planar alignment effective to reflect light through the front plate, as is known in the art. While in the embodiment shown in FIG. 1 the film on front plate surface 18 is patterned to define a discrete electrode 14, alternately electrode 14 may be formed of an unpatterned layer covering surface 18 including adjacent pixels, in which case the layer cooperates with patterned electrode 18 in applying a field limited for switching region 5. Electrodes 14 and 16 are adapted to be connected to an external electrical power source (not shown) to establish an electrical voltage potential therebetween and thereby form an electrical field at region 5 sufficient to switch the cholesteric material between the transparent and reflective states.

Layer 4 of cholesteric liquid crystal material is disposed in the gap between front plate 6 and back plate 8. Cholesteric liquid crystal material is preferably of the type having positive dielectric anisotropic properties. Suitable liquid crystal materials are well known in the art and generally are composed of a mixture of host substance consisting of nematic liquid crystal molecules and a dopant consisting of chiral molecules. The proportion of the chiral to host constituents determines the natural helical pitch and reflective wavelength, $\lambda$, of the cholesteric material. In general, for common materials, a low concentration of dopant is utilized to achieve longer, red wavelengths, with progressively greater additions made to achieve shorter, green to blue wavelengths. In this embodiment in which the cholesteric liquid crystal material in the reflective state reflects light in the visible spectrum for forming a multi-color display, it is preferred to select a liquid crystal material that, in the reflective state and in the absence of an electric field applied in accordance with this invention, reflects light at a first wavelength corresponding to a blue color.

In accordance with a preferred embodiment of this invention, device 2 further comprises a pair of second electrodes 24 and 26 disposed about region 5 for applying an electric field $E_p$ across the region in the direction 25 generally perpendicular to the switching field $E_t$ 22. For this purpose electrodes 24 and 26 are suitably disposed on back plate 8 about electrode 16 and covered by polymeric coating 15 and 17. A variable voltage AC power supply 28 and switch 30 are provided to apply an AC voltage between electrodes 24 and 26 to create the applied electric field, $E_p$. While this embodiment shows electrodes 24 and 26 both located on back plate 8, any location of electrodes in close proximity to the cholesteric liquid crystal material generates an $E_p$ sufficient to drive the cholesteric liquid crystal pitch change is acceptable. Accordingly, in an alternate embodiment, the second electrodes may be disposed on front plate 6, or one on the front plate and one on the back plate.

During operation, cholesteric liquid crystal material at region 5 is activated to create a dark or colored pixel for a display viewed in direction 3. When cholesteric material is in a transparent state, ambient light entering the display through front plate 6 is transmitted through region 5 and absorbed by layer 10, thereby creating a dark or black pixel. To create a color pixel, an electrical potential is applied to first electrodes 14 and 16 to establish a switching electric field $E_t$ in a first direction 22 sufficient to cause the material to switch to the reflective state. It is pointed out that the reflective state is maintained even after the applied electric field is discontinued until such time as a an electric field is applied to switch the material back to the transparent state. In the reflective state, the material at region 5 intercepts ambient light admitted to the device through front plate 6 and reflects light of selected wavelength back through the front plate. In the absence of any applied field such as between electrodes 24 and 26, the reflected light is characterized by a first wavelength, which depends upon the nature and composition of the liquid crystal material. In accordance with this invention, with the material in the reflective state, a second electrical potential is applied between electrodes 24 and 26 to create a field $E_p$ in the second direction 25 distinct from the first direction 22 and to cause the liquid crystal material at region 5 to reflect light characterized by a second wavelength different form the first wavelength. In this manner, the wavelength of the reflected light can be altered to achieve a desired color for the pixel.

While the invention is not limited to the following theory, it is believed that cholesteric liquid crystal material comprises nematic liquid crystal molecules that are elongated along a molecular axis. In the transparent state, the molecules are randomly scattered. However, when switched to a reflective state, the molecules align in a helical arrangement along a helical axis, with the molecular axis disposed in a first direction parallel to the front plate and the helical axis disposed in a second direction perpendicular to the first direction and the front plate. The desired axis orientation is accomplished by the interaction of the rubbed surfaces with adjacent molecules and results in light reflected along direction 3 for viewing. The wavelength of the reflected light is related to the pitch of the helical arrangement, which, in the absence of an applied field, is determined by the composition of the liquid crystal material. In accordance with this invention, application of a suitable electric potential between electrodes 24 and 26 produces an electric field generally parallel to direction 25 and perpendicular to the helical arrangement. Interaction between the applied field and the cholesteric liquid crystal molecules alters the pitch of the helical arrangement. This increased pitch changes the reflected wavelength to generate a color shift from the initial color to any desired color of longer wavelength. It is found that the difference between the first, original wavelength and the second wavelength is dependent upon the voltage differential between the electrodes and increases as a function of the field. Moreover, a field $E_t$ applied in direction 22 can be applied in conjunction with $E_p$ in direction 25 for grayscale control by switching between transparent and reflective states.

Colors within a wide range can be achieved for a display 2 by beginning with a cholesteric liquid crystal 4 having a wavelength in the visible blue or ultraviolet region and increasing the voltage across electrodes 24 and 26 to drive the crystal through all colors toward the red wavelengths. While two electrodes have been shown in FIG. 1, multiple electrodes may be used. It is preferred to locate electrodes 24 and 26 as closely together as practical to reduce the voltage required to drive the color change. In general, it is preferred to minimize the applied voltage while achieving the desired color for the pixel. It is found that, for electrodes spaced apart by a distance of about 50 microns, suitable color changes may be affected by applying voltages between about 5 to 500 volts. Other voltages may also be effective depending on the chemical composition of the cholesteric liquid crystals and the spacing of the electrodes. Color shifts are suitably obtained by applying DC or AC voltages, it is preferred to apply alternating current voltage to avoid accumulation of impurities in the liquid crystal material that would otherwise tend to occur adjacent to the electrodes.

Figure 2:
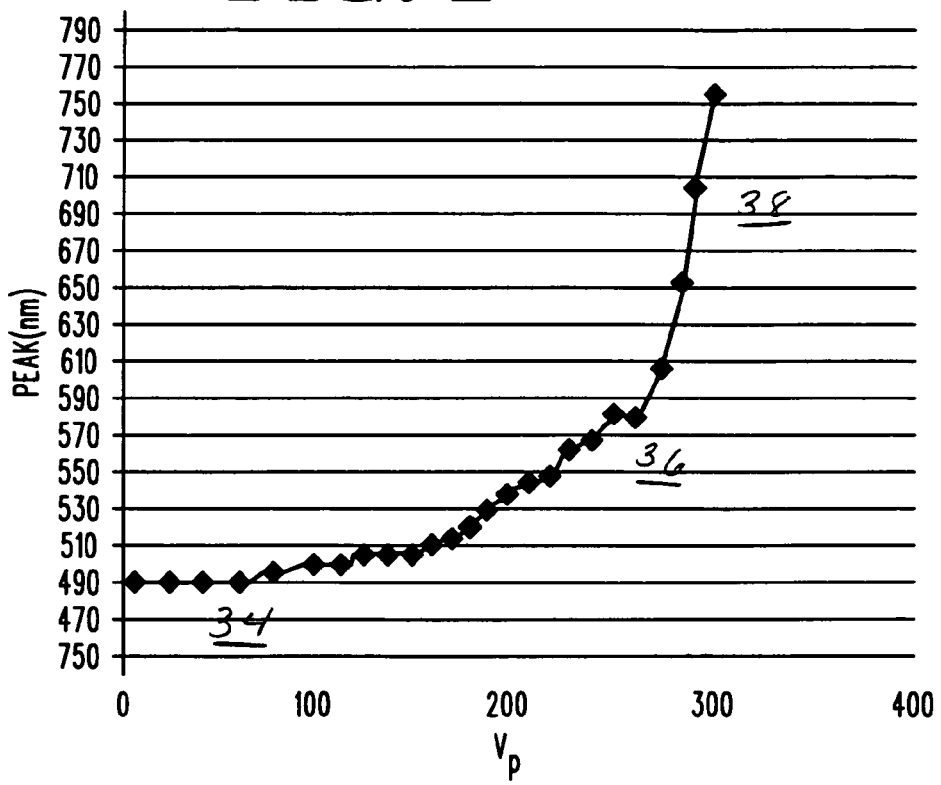
FIG. 2 is a plot of peak wavelength in nanometers of reflected light of a cholesteric liquid crystal material as a function of applied voltage, $V_p$, applied in accordance with this invention.

With reference to FIG. 2, a plot of peak wavelength in nanometers of a reflective cholesteric liquid crystal display as a function of applied field $E_p$ is shown for a display device containing a blue liquid crystal cholesteric material available under the designation BL061 from Merck Chemical Co. Front and bottom plates were made of glass and included an interior coating of a clear polyimide resin. The electrodes were composed of indium tin oxide, formed by coating the plate surfaces and patterning. Electrodes 24 and 26 were approximately 10 microns wide and spaced approximately 50 microns apart. The cholesteric liquid crystal layer was approximately 5 microns thick. A square wave AC voltage of various amplitudes was applied at 1 kHz to generate the in-plane electric field. FIG. 2 shows the wavelength of the reflected light as a function of the applied voltage between the electrodes. As indicated at region 34, in the absence of an applied field, the reflected light had wavelengths in the blue spectrum, creating a blue color when observed. As indicated by 36, application of a voltage between about 240 and 260 volts alters the wavelength to reflect light in the green spectrum. Application of higher voltages above about 280 volts shifts the color into the red spectrum, indicated at 38.

Figure 3:
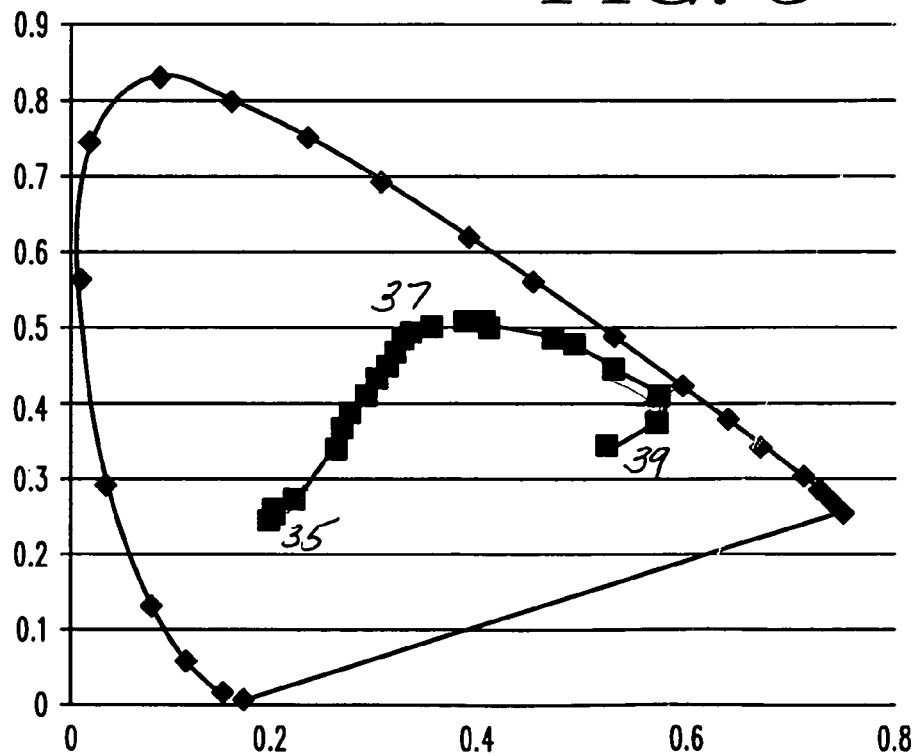
FIG. 3 is a 1931 CIE Chromaticity Diagram showing color of reflected light for cholesteric liquid crystal material subjected to an applied voltage, $V_p$, in accordance with this invention.

FIG. 3 shows the results of FIG. 2 plotted on a 1931 x,y Chromaticity Diagram with blue, green and red regions indicated at 35, 37 and 39, respectively.

It can be seen that in the above described cell the initially blue cholesteric liquid crystal was driven to green at an applied voltage of approximately 240 to 260 V and red at approximately 280 to 300 V. We have found that decreasing the distance between the electrodes reduces the voltage required to affect a desired color change. Also, multiple electrodes may be employed to apply an effective field over greater distances and thereby facilitate uniform color in pixels of larger dimensions.

Figure 4:
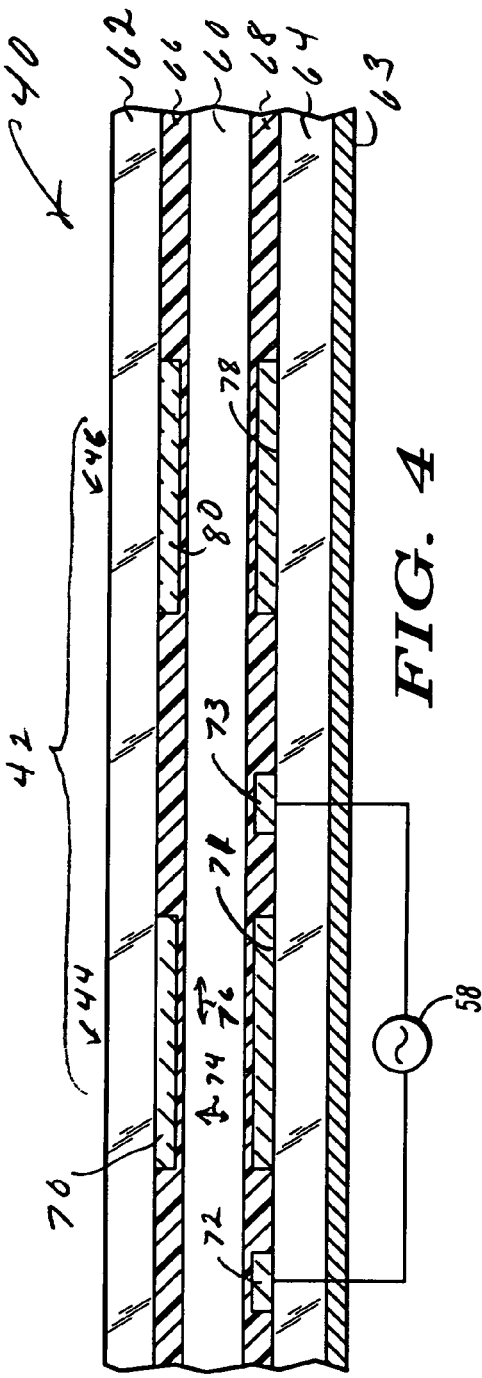
FIG. 4 is a sectional view of a pixel of a cholesteric liquid crystal display device comprising adjacent subpixels, in accordance with another aspect of this invention.

In accordance with alternate aspect of this invention, a display having an enhanced color range is provided by a liquid crystal display device 40 in FIG. 4. Device 40 comprises a pixel 42 that includes subpixels 44 and 46, of which at least on subpixel 44 includes means for applying an electric field to vary the reflected color in accordance with the present invention. Subpixels 42 and 44 are positioned in close proximity such that light reflected by each is perceived by a viewer as a single pixel in the display.

Referring to FIG. 4, device 40 is formed similar to device 2 in FIG. 1 and comprises a layer 60 of cholesteric liquid crystal material interposed between front and back plates 62 and 64 bearing inner polymeric coatings 66 and 68. An opaque coating 63 is applied to plate 64. At subpixel 42 a pair of first electrodes 70 and 71 are disposed for applying an electric field in a first direction 74 for switching the cholesteric material between a transparent and a reflective state. Also at subpixel 44, a pair of second electrodes 72 and 73 is disposed connected to a variable AC voltage supply 58 for generating an electric field in a second direction 76 effective to alter the color of the light reflected by the cholesteric material in the reflective state. At subpixel 46, a pair of electrodes 78 and 80, similar to electrodes 70 and 72, is disposed for producing an electric field parallel to direction 74 for switching of the adjacent cholesteric material between the transparent and reflective states.

During operation, subpixels 44 and 46 may be independently switched between reflective and transparent states by application of an electric potential to electrodes 70 and 72 and electrodes 78 and 80, respectively. With both subpixels in the transparent state, ambient light entering the device through front plate 62 is transmitted through layer 60 and absorbed by opaque layer 63, thereby creating a dark pixel. To create a color pixel, an electrical potential is applied to electrodes 71 and 72 to switch the adjacent cholesteric material at subpixel 44 to a reflective state. Similarly, an electric voltage may be applied to electrodes 78 and 80 to switch subpixel 46 to the reflective state. The preferred cholesteric material reflects light at a wavelength corresponding to a blue color in the absence of an applied field in direction 76. Thus, switching one or both of subpixels 44 or 46 provides a blue color for pixel 42. To alter the color an electrical potential is applied to electrodes 72 and 73 in a manner similar to electrodes 24 and 26 in FIG. 1. The reflected light with the selected color then combines with reflected blue light from subpixel 46 to achieve a desired overall color for the pixel.

It is known to obtain a wide range of colors by combination of red, green and blue primary colors. Thus, by selectively adjusting the color of subpixel 44 and selectively combining the light therefrom with reflected light from subpixel 46, a full range of colors may be achieved. By way of example, a cholesteric material is selected that reflects light in the blue region 35 of the Chromaticity Diagram of FIG. 3. The voltage of supply 58 may be adjusted to alter the cholesteric material to reflect green light for subpixel 44, that is, light in region 37.

Subpixel 46 may be in the darkened state to create a green pixel or may be in a reflective state, whereupon the color of the pixel results from the combination of the blue and green colors from the subpixels. A higher voltage may be applied to electrodes 72 and 73 to drive the color of subpixel 44 toward the red range 39. With subpixel 46 darkened, a red pixel is then obtained for the display. Alternately, with subpixel 46 in the reflective state, a color from the combination of blue and red is obtained for the pixel. The color resulting from the combination with the reflected blue light depends upon the precise wavelength of the reflected light from subpixel 44, which in turn is dependent upon the voltage applied thereto. Thus, by adjusting the voltage to subpixel 44, any color within a full range may be selected for the pixel.

In the described embodiments, the device is employed that reflects light within the visible spectrum for producing a display that is viewable by a person. This invention may also be employed in other types of cholesteric liquid crystal devices. Thus, this invention may be employed in an optical switch comprising a cholesteric liquid crystal material to apply an electric field to adjust the wavelength of the light transmitted or reflected by the switch. For this purpose, cholesteric materials may be utilized having compositions effective to reflect light outside the visible spectrum, that is ultraviolet or infrared light.

While our invention has been described in terms of specific embodiments, clearly other forms could be readily adapted by one skilled in the art. Accordingly, the scope of the invention is to be limited only in accordance with the following claims.

What is claimed:

1. A liquid crystal device comprising
    a transparent front plate;
    a back plate spaced apart from the transparent front plate;
    a cholesteric liquid crystal material between said transparent front plate and said back plate, said cholesteric liquid crystal material having a reflective state wherein said cholesteric liquid crystal material reflects light through said front plate, said light characterized by a first wavelength in the absence of an applied electric field; and
    means for applying an electric field, parallel to the back plate, to said cholesteric liquid crystal material in the reflective state to cause said cholesteric liquid crystal material to reflect light characterized by a second wavelength different than said first wavelength.

2. The cholesteric liquid crystal device of claim 1 wherein the cholesteric liquid crystal material in said reflective state comprises molecules in a helical arrangement having a helical axis in a first direction, and said means is adapted to apply an electric field in a second direction nonparallel to the first direction.

3. The cholesteric liquid crystal device of claim 2 wherein the cholesteric liquid crystal material in said reflective state is characterized by a first pitch in the absence of an applied electric field and wherein said means is adapted to apply an electric field effective to produce a second pitch different from the first pitch.

* * * * *